Oct. 15, 1935.  H. E. OSKAMP  2,017,728
DEHYDRATION APPARATUS
Filed Jan. 23, 1933  2 Sheets-Sheet 1
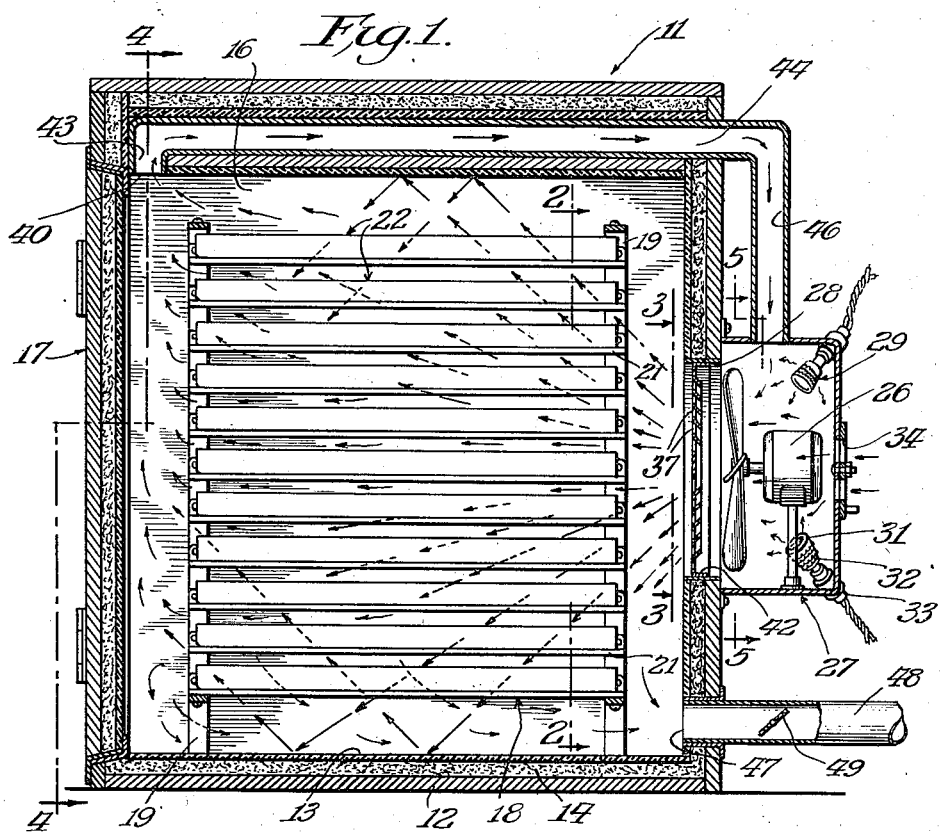
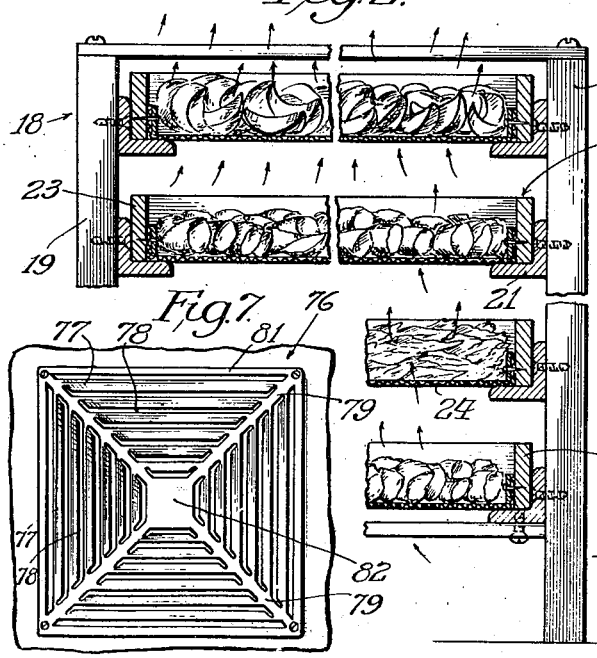
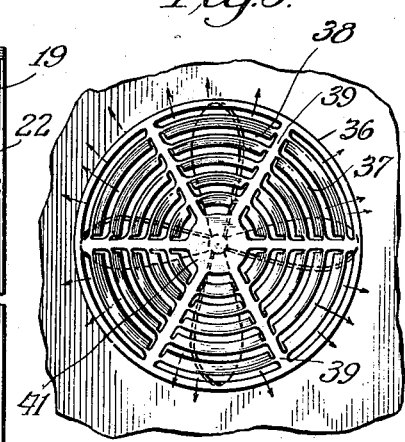
Inventor
Howard E. Oskamp.
By Mueller & McLaughlin
Attys.

Oct. 15, 1935.　　　　H. E. OSKAMP　　　　2,017,728
DEHYDRATION APPARATUS
Filed Jan. 23, 1933　　　2 Sheets-Sheet 2
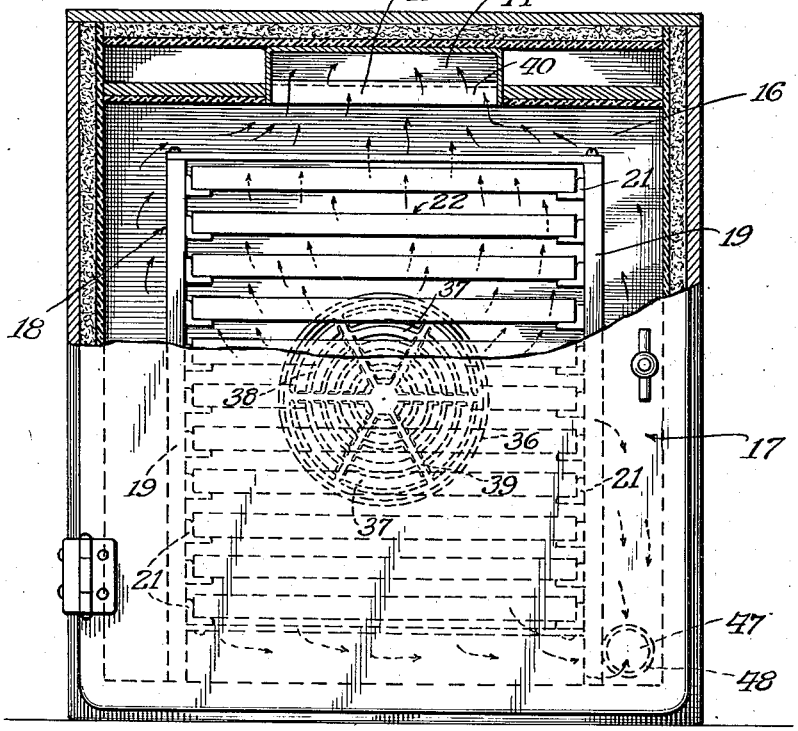
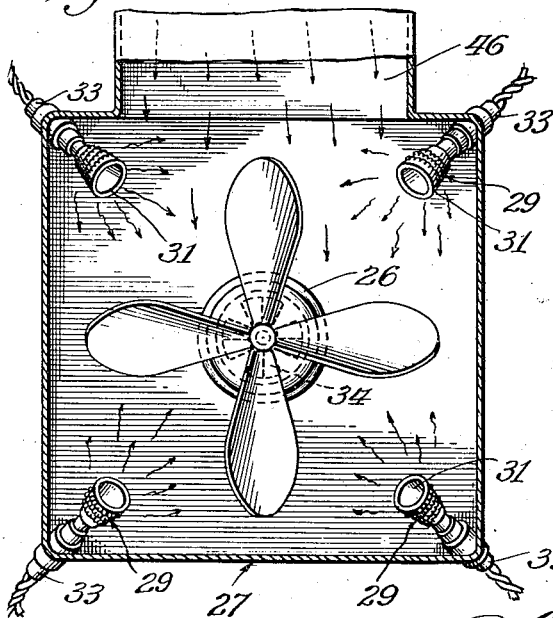
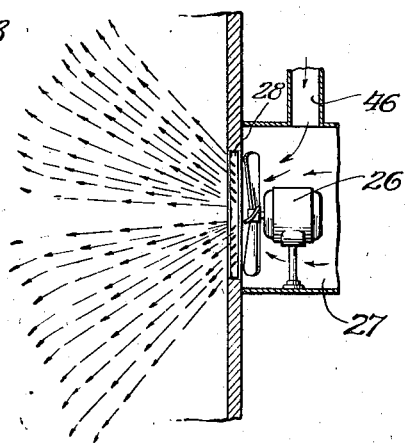
Inventor
Howard E. Oskamp
By Mueller & McLaughlin
Attys.

Patented Oct. 15, 1935

2,017,728

UNITED STATES PATENT OFFICE 2,017,728

DEHYDRATION APPARATUS

Howard E. Oskamp, Wheaton, Ill.

Application January 23, 1933, Serial No. 653,075

6 Claims. (Cl. 34—39)

My invention relates in general to dehydration, and in particular to apparatus for accomplishing the dehydration.

Dehydration in the past has been accomplished generally by passing heated air through chambers of various types to remove the moisture from vegetables and other food stuffs stacked therein. The drying is carried on while at the same time attempting to retain the vitamin and mineral content in the food stuffs as well as the flavor, so that the same food value will be obtained from eating the concentrated product as might be obtained from vegtables and the like in their original form. Dehydrated food stuffs have found considerable use where the facilities for transportation are either limited or so expensive as to necessitate the greatest food value in the smallest bulk. Dehydrated food stuffs have also found application in the field of medicine, where the medicinal qualities of the food are utilized in concentrated form as a more effective cure for the ailment under treatment.

A great effort has been made in the past to obtain a uniform heated-air distribution in every point of the dehydrating chamber or room, so that the drying will be carried out uniformly at every point. In the devices in use at the present time, "hot spots" develop at different points in the chamber so that the drying of the vegetables or other food stuffs is more rapid at that point, resulting in burning or scorching of the particular article, causing the loss of mineral or vitamin content. As a result of this situation the dehydrated product is not uniform in its food or medicinal qualities and in some instances it has often been impossible to obtain two containers of a dehydrated product in which the desired mineral or vitamin value of the contents is the same. This situation has hindered the extent of the use of dehydrated products.

In an effort to eliminate the so-called "hot spots" very elaborate and extensive dehydrating plants have been built up, which in turn materially increase the cost of the dehydrated product. The means for heating the air in these large plants has in general been narrowed down to steam or hot-water heat or hot air furnace. These means for heating the air, introduce the problem of sensitive heat control so as to maintain the required temperature throughout the process, and terminate the dehydration at the proper time. It is an object of my invention to provide an improved apparatus for dehydration.

A further object is to provide an apparatus which accomplishes dehydration in a manner insuring the retention of vitamin and mineral content of food stuffs dehydrated.

It is a further object to provide an apparatus having a dehydrating chamber in which the heat distribution is uniform in every point of that chamber, resulting in a uniform product.

A further object is to provide a means for circulating the air through the dehydrating chamber so as to obtain a uniform temperature in every point in the chamber.

A further object is to provide a simple and inexpensive apparatus for dehydrating food stuffs.

It is also an object of my invention to provide air heating means in the complete dehydrating apparatus capable of sensitive temperature control, to prevent scorching and burning.

A still further object is to provide a dehydrating apparatus capable of being set up in relatively small complete individual units so as to provide separate units for foods having conflicting odors, while at the same time maintaining a low initial and operating cost.

Other objects and advantages of my invention will be apparent from the description taken with the drawings, in which;

Fig. 1 is a side view partly in section of the complete dehydrating apparatus.

Fig. 2 is an enlarged fragmentary portion of the tray support along the line 2—2 of Fig. 1 with food stuffs distributed on the trays preliminary to dehydration.

Fig. 3 is a front elevation along the line 3—3 of Fig. 1, showing the front view of the air diffuser.

Fig. 4 is a front elevation partly in section along the line 4—4 of Fig. 1.

Fig. 5 is a front elevation along the line 5—5 of Fig. 1 of the heating element and fan chamber.

Fig. 6 is a side view in section of the fan and air directing means, with arrows illustrating the path of the air circulated outwardly from the fan into the dehydrating chamber, and Fig. 7 is a front elevation of a modification of the diffuser.

In practicing my invention I provide an insulated drying chamber having a squared interior, with a framework positioned therein for holding drying trays. A perforated bottom is provided in the trays to permit ready circulation of the air through them. Air is drawn into a fan chamber on the rear of the drying chamber, heated, and circulated through the latter by means of a fan cooperating with an air diffuser mounted in the wall of the drying chamber. By virtue of the diffuser employed, the heated air is distributed evenly to every portion of the drying chamber and the saturated or partially saturated air blown out through an outlet adjacent the floor. A portion of the heated air is blown through a port in the ceiling of the drying chamber, and conveyed through a recirculating duct to the fan chamber in the rear where it is recirculated through the drying chamber.

Referring now to the drawings: An insulating chamber 11, as illustrated in Fig. 1, is provided which comprises an outer covering 12, which may be of wood, or any other suitable material, and insulating board 13 separated by insulating material 14. This provides a heavy insulated wall, sufficient to maintain the necessary drying temperature in the chamber 16. Access to the drying chamber 16 is provided through the hinged door 17 insulated in the same manner as described for the walls. In dehydrating food stuffs it has been found advisable to slice the vegetables, meat or the like, and lay the slices in trays having perforated bottoms, to allow the ready circulation of air over the maximum surface made possible by cutting up the food stuffs to be dehydrated. When the food stuffs are originally put in the trays, the pores are open. The dehydration must be carried out in such a manner that the moisture is evaporated from the material without closing up the pores too quickly or rupturing the cell walls, thus retaining the desired cell contents in their original value. Scorching or burning the material or closing up the pores destroys the food or medicinal qualities desired and when the dehydrated material is later ground up, mixed and packed, the unevenness heretofore discussed, results. A frame 18 is provided for holding the trays 22, which frame comprises suitably supported posts 19 in upright position, with angle bars 21 at spaced intervals on the posts to provide runways for the trays. Any desired number of trays may be used depending upon the available space in the drying chamber. Each tray 22 comprises a frame 23 which may be made of metal, wood or any other suitable material with a coarse-mesh wire cloth bottom 24, secured to the sides in any suitable manner as shown in Fig. 2. Various types of vegetables are shown distributed over the perforated bottom in Fig. 2 to illustrate the manner in which food stuffs are distributed over these trays for dehydrating.

Heated air is circulated through the drying chamber 16 by means including a fan 26 mounted in a fan chamber 27, to the rear of the drying chamber 16 and communicating therewith through an opening 28. The fan chamber 27 may be constructed of any suitable material, preferably a heavy composition board which will serve as a heat insulator, and a mounting on which electric heating elements 29 may be secured in each corner. With respect to the heating elements, very satisfactory results have been obtained with an ordinary replaceable unit comprising an earthenware cone 31 having a coil of resistance wire 32 wound thereon, and a plug (not shown) secured to one end and connected with the heating coil 32 to be inserted in a socket 33. The sockets are mounted one in each corner of the fan chamber with suitable connection to a source of current. The replaceable heating elements are initially inexpensive and make it possible to readily replace them in case they burn out with use. The adjustable inlet 34 in the back of the fan chamber, makes it possible to control the influx of the air which is drawn in by the fan and blown into the drying chamber.

As discussed above, many of the objectionable consequences of the dehydrating processes such as non-uniform product, loss of vitamin and mineral content were the result of an uneven distribution of the heated air employed in the drying. If the air was blown into the drying chamber by means of a fan, those portions adjacent the air inlet dried more quickly than those further removed, and the heat adjacent the inlet in order to be great enough to maintain the necessary temperature throughout the drying chamber was so great often as to burn or scorch the food stuffs. The air diffuser 36 mounted in the opening 28 is designed to eliminate these difficulties and produce an air flow which is spread out radially from the face of the member in the manner illustrated in Fig. 6.

The diffuser 36 as illustrated in Fig. 3 is circular in form and consists of a series of deflectors 37, which are inclined preferably at an angle of approximately 45° to the axis of rotation of the fan. The deflectors are spaced apart radially so that the semi-circular horizontally extending plane of the top of one deflector is slightly removed from a like plane of the bottom of the deflector immediately above the first. This provides passages or slots 38 between adjacent deflectors with the latter forming inclined walls for the slots. The deflectors are preferably arranged in concentric circles with ribs 39 spaced at intervals around the entire diffuser and extending radially from the center 41. A rim 42 on the outside of the deflectors forms the necessary support for the ribs 39. The rim 42 also provides an anchoring flange for retaining the diffuser in the opening 28. The member may be stamped out of a single piece of sheet metal, with six deflector sections supported by the intervening ribs 39.

As a result of the operation of the diffuser 36, the direct longitudinally moving air column from the fan 26 is spread out radially into a substantially conical form causing the moving air to mix and intermingle with the surrounding relatively still air with a minimum loss of flow. The intermingling and mixing is promoted by the deflection and counter-deflection of the air as it strikes the frame 18 and trays 22, as well as the walls of the dehydrating chamber. It has been found that heat will in a measure cling to the walls of the chamber 16, and unless circulated will form areas of a higher temperature than the surrounding air. This is overcome in a satisfactory manner as the result of my diffuser causing the individual air columns to emanate from the face thereof at an angle of approximately 45°. Although the air is deflected in part as it passes through the frame 18 and drying trays 22, sufficient amount strikes the walls of the squared dehydrating chamber 16 to in effect "wash" said walls and maintain a circulation of air throughout the entire chamber. The "washing" operation is important in preventing the formation of "hot spots" as heretofore discussed, and also promotes the general circulation and distribution of heated air throughout the entire dehydrating chamber.

In operating the dehydrator I have found that the highest efficiency both as to the circulation and distribution of air, and the operation of the fan is obtained by positioning the fan 26 so that the blades rotate in a plane from ½ to ¾ of an inch removed from the circulator 36.

A modification of the diffuser is illustrated in Fig. 7 which is substantially square in shape. This diffuser 76 comprises four triangular deflector sections made up of individual deflectors 77 formed at an angle of 45° with axis of rotation of the fan similar to deflectors 37 and having passages 78 between planes of adjacent deflectors. Ribs 79 separate the deflector sections and serve as supports for the deflectors 77, while the ribs in turn are supported by a rim 81 cooperating with a center portion 82. The air is projected from diffuser 76 substantially in the form of an inverted pyramid to circulate the air uniformly over the entire dehydrating chamber. It is also understood that other geometrical forms may be used for the diffuser, with each construction employing the same principles heretofore described.

Means for recirculating a portion of the heated air is provided by the upwardly extending duct 43 with an opening 40 as illustrated in Fig. 1, which duct connects with a rearwardly extending passage 44 supported in the roof of the chamber 11, and insulated on the upper and lower sides in the same manner as the outside walls of the chamber. This passage connects with a downwardly extending portion 46 which in turn opens into the fan chamber 27. The air recirculated is that which has passed through the drying chamber without becoming saturated and naturally rises to the top to be drawn off through the port 40. Recirculating the heated air in this manner reduces the amount of heating necessary on the fresh air drawn in through the inlet 34 in order to maintain the same drying temperature.

An outlet 47 is provided adjacent the floor in one corner of the chamber 16 and provides means for removing the saturated or partially saturated air from the drying chamber 16. Inasmuch as this saturated air is heavier than normal, it readily sinks to the bottom of the chamber in the circulating process and is carried through the pipe 48 to the outside of the room in which the dehydrator 11 is mounted. A damper 49 permits adjustment of this opening as it becomes necessary to vary the amount of air to be blown out of chamber 16. I have found it advisable to maintain a slight pressure within the drying chamber, and obtain this by maintaining the effective area of outlet 47 smaller than the area of inlet 34, preferably in the ratio of 4 to 5.

In practicing the invention, the vegetables, fruits, or other articles to be dehydrated are first sliced and then thoroughly washed. While wet the articles are placed on the trays 22 and the latter slid into position on the frame 18. The frame 18, which is square in its outside dimensions to correspond to the squared drying chamber 16 is slidably placed in the chamber through the door to a position in which an open space of perhaps 6 inches is maintained around all sides and top and bottom as shown in Fig. 1. This spacing facilitates the air circulation throughout the chamber and aids in maintaining a uniform heat distribution. After sealing the chamber 16, the heating elements 29 are turned on and the fan 26 simultaneously started. This immediately starts the circulation of heated air through the chamber 16, which air is recirculated in part, with the remaining saturated or partially saturated portion discharged through the pipe 48 to the outside.

Any suitable thermostat may be employed for regulating the temperature in the drying chamber, and this connected with the electric heating elements provides a very sensitive control of the temperature for carrying out the dehydrating process. Inasmuch as the dehydration is carried out by evaporating the moisture from the food stuffs at a comparatively low temperature, a check is maintained on the humidity in the room from which the air is drawn through inlet 34 so as to determine the length of time over which the drying must be continued. However, drying is not completed abruptly and no harm results from continuing the circulation of heated air through the chamber after this point is reached, and abrupt termination is not necessary. The process may be continued without detrimental effects inasmuch as the temperature in the chamber 16 is maintained below the danger point by thermostatic control, and the uniform distribution of air throughout the chamber prevents the formation of "hot points".

After the dehydration is completed the trays 22 may be removed from the drying chamber 16 and the dehydrated products ground up or treated in any desired manner.

By the use of my method, I therefore dehydrate vegetables, fruits and other food stuffs at a low, controlled temperature in a manner to produce a uniform product retaining all the desired mineral and vitamin content, as well as the original flavor. The apparatus employed is simple and inexpensive to construct, and makes possible a uniform heated air distribution throughout the drying chamber which prevents the undesirable consequences heretofore discussed.

The simple construction of the dehydrator makes it possible to construct and maintain a battery of individual units so that food stuffs having conflicting odors may be separately treated to prevent any mixing whatever.

Although I have described my process and apparatus in its preferred embodiment, it is understood that variations may be made therein without departing from the spirit and scope of the invention, and I limit my invention only by the scope of the appended claims.

What I claim as new and desire to protect by Letters Patent of the United States is:

1. An apparatus for dehydrating foodstuffs and the like comprising only a single dehydrating chamber having a squared interior, means for supporting foodstuffs in spaced relationship in said chamber, a fan mounted at one wall of the chamber in the center thereof, means for heating the air to be supplied to the fan, air diffusing means mounted directly in front of the fan for directing the air from the fan forwardly and outwardly therefrom in an inverted cone shape, said air diffusing means including a plurality of connected deflector segments with the outside faces in a single vertical plane and positioned in a manner to present pairs of segments extending from the center of the said means outwardly in opposite directions, with each deflector segment comprising a plurality of spaced apart concentric deflectors extending inwardly from the face thereof and toward the center of said diffusing means, whereby to provide a uniform heated air distribution and circulation to the entire squared chamber, and an air outlet adjacent the bottom of the chamber providing for the passage of air therefrom.

2. An apparatus for dehydrating foodstuffs and the like comprising a single dehydrating chamber having four walls and a top and a bottom, means for supporting foodstuffs in spaced relationship in said chamber, a fan mounted at one wall of the chamber in the center thereof having air diffusing means mounted directly in front of said fan to distribute air uniformly throughout said chamber, said air diffusing means comprising a one-piece member having a plurality of deflector segments, with one segment comprising a plurality of concentric deflector blades extending from the face of the member inwardly and upwardly, and an adjacent segment having deflectors extending inwardly and sidewardly, means for recirculating a portion of the air from the chamber, said means including an air shaft comparatively small in cross-section opening directly out of the chamber at the wall opposite the fan mounting wall at the top of said chamber and extending rearwardly and downwardly outside thereof to the fan, and an air outlet in the fan mounting wall of the chamber beneath said fan for removing the heavy moisture-laden air from said chamber.

3. An apparatus for dehydrating foodstuffs and the like comprising only a single substantially closed dehydrating chamber having front and rear walls, side walls and a top and bottom, means for supporting foodstuffs in spaced relationship in said chamber, with said rear wall apertured at the center thereof, a fan mounted in back of said wall directly to the rear of said aperture, air diffusing means mounted in said aperture in front of said fan to distribute air uniformly throughout said chamber, said air diffusing means comprising a one-piece member having a plurality of deflector segments, with one segment comprising a plurality of concentric deflector blades extending from the face of the member inwardly and upwardly, and an adjacent segment having deflectors extending inwardly and sidewardly, an air shaft opening out of the top front of said chamber and extending rearwardly and downwardly on the outside thereof to the fan for recirculating a portion of the air from the chamber, and an outlet opening out of the rear wall of the chamber beneath the fan for removing the remaining portion of the air in the chamber, which said portion is heavily moisture laden.

4. An apparatus for dehydrating foodstuffs and the like comprising a single dehydrating chamber having a squared interior, means for supporting foodstuffs in said chamber with said chamber having a rear wall apertured in the center thereof, a fan mounted to the rear of said aperture, an air diffuser supported in the aperture directly in front of the fan including a plurality of supported deflectors lying in a single vertical plane and arranged in parallel concentric form from the center of said diffuser with each deflector extending inwardly at an angle of 45° with a line perpendicular to the center of said diffuser whereby to direct air from the fan forwardly and outwardly therefrom in a substantial inverted cone shape to provide uniform air distribution throughout the squared chamber and to strike the walls thereof in a "washing" action, an air shaft opening out of the top front of said chamber for recirculating a portion of the air and an outlet at the rear bottom of the chamber for escape of the remaining portion.

5. In an apparatus for dehydrating foodstuffs and the like, a dehydrating chamber having a squared interior for receiving foodstuffs in spaced relationship, with said interior having substantially closed walls on top, on the bottom, and all sides, with the rear wall apertured in the center thereof for carrying an air diffuser, a fan housing with an opening in the back of the same supported outside the rear wall and communicating with the interior through the aperture in the rear wall, air heating means in the housing, a fan mounted in said housing directly in back of the aperture in the squared interior for drawing air through the opening to be heated in the housing, and impelling the heated air through the diffuser to be distributed evenly throughout the squared interior, with said top of the interior having an opening in the front and center thereof, and a duct leading therefrom over said top to open into the top of the fan housing whereby a portion of the heated moisture laden air is directed through said duct to the fan housing to mix with the fresh air and be reheated as a new mixture for recirculation by the diffuser throughout the squared interior and over all walls thereof and an outlet to permit free passage of air from said chamber.

6. An apparatus for dehydrating foodstuffs and the like comprising a single dehydrating chamber having four walls, a top and a bottom, means for supporting material to be dehydrated in spaced relationship in said chamber, a fan mounted at one wall of the chamber having air diffusing means mounted directly in front of said fan to distribute air throughout said chamber, said air diffusing means including a plurality of connected deflector segments with the outside faces in a single vertical plane and positioned in a manner to present pairs of segments extending from the center of the said means outwardly in opposite directions, with each deflector segment comprising a plurality of deflectors spaced substantially equally apart over their length extending inwardly from the face thereof and toward the axis of the fan, a shaft opening out of the chamber for carrying air for recirculation to the chamber, and an air outlet adjacent the bottom of the chamber for removing moisture-laden air therefrom.

HOWARD E. OSKAMP.